(12) United States Patent
Willey et al.

(10) Patent No.: US 12,019,876 B1
(45) Date of Patent: Jun. 25, 2024

(54) FEED FORWARD TRAINING OF MEMORY INTERFACES

(71) Applicant: Advanced Micro Devices, Inc., Santa Clara, CA (US)

(72) Inventors: Aaron D Willey, Hayward, CA (US); Karthik Gopalakrishnan, Cupertino, CA (US); Pradeep Jayaraman, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 15 days.

(21) Appl. No.: 18/079,239

(22) Filed: Dec. 12, 2022

(51) Int. Cl.
*G06F 3/06* (2006.01)

(52) U.S. Cl.
CPC .......... *G06F 3/0614* (2013.01); *G06F 3/0629* (2013.01); *G06F 3/0653* (2013.01); *G06F 3/0673* (2013.01)

(58) Field of Classification Search
CPC ................... G06F 3/06; G11C 7/062
See application file for complete search history.

(56) References Cited

U.S. PATENT DOCUMENTS

| 7,924,637 | B2 | 4/2011 | Searles et al. | |
| 8,606,989 | B2* | 12/2013 | Chafin | G06F 12/0879 |
| | | | | 711/167 |
| 10,705,989 | B2* | 7/2020 | Ware | G06F 13/1689 |
| 2013/0262791 | A1* | 10/2013 | Henderson | G11C 29/023 |
| | | | | 711/E12.001 |

OTHER PUBLICATIONS

JEDEC Standard; "Graphics Double Data Rate (GDDR6) SGRAM Standard"; white paper; JESD250B; (Revision of JESD250A, Jul. 2017); JEDEC Solid State Technology Association; 3103 North 10th Street, Suite 240 South, Arlington, VA 22201; United States; Nov. 2018; 200 pages.

* cited by examiner

*Primary Examiner* — Khoa D Doan
(74) *Attorney, Agent, or Firm* — Polansky & Associates, P.L.L.C.; Paul J. Polansky; Nathan H. Calvert

(57) ABSTRACT

A data processor, system, method, integrated circuit are provided which update timing values for accessing a memory to compensate for voltage and temperature (VT) drift during operation. The method includes performing a link retraining sequence for a plurality of DQ lanes of the memory bus and determining a first phase offset based on the link retraining. The method includes calculating a second offset based on the first offset, applying the second offset to a plurality of command CA lanes of the memory bus.

20 Claims, 3 Drawing Sheets

FEED FORWARD TRAINING OF MEMORY INTERFACES

CROSS-REFERENCE TO RELATED APPLICATIONS

Related subject matter is found in U.S. patent application Ser. No. 17/855,066, filed Jun. 30, 2022, invented by the inventors hereof and assigned to the assignee hereof.

BACKGROUND

Modern dynamic random-access memory (DRAM) provides high memory bandwidth by increasing the speed of data transmission on the bus connecting the DRAM and one or more data processors, such as graphics processing units (GPUs), central processing units (CPUs), and the like. In one example, graphics double data rate (GDDR) memory has pushed the boundaries of data transmission rates to accommodate the high bandwidth needed for graphics applications. In order to ensure the correct reception of data, modern GDDR memories have required extensive training prior to operation to make sure that the receiving circuit can correctly capture the data. Over time, however, GDDR data transmission systems experience voltage and temperature (VT) drift, which cause the optimum points for the delays to change such that re-training must be performed periodically, which causes the system to have to stall operation while performing the retraining.

Figure 1:
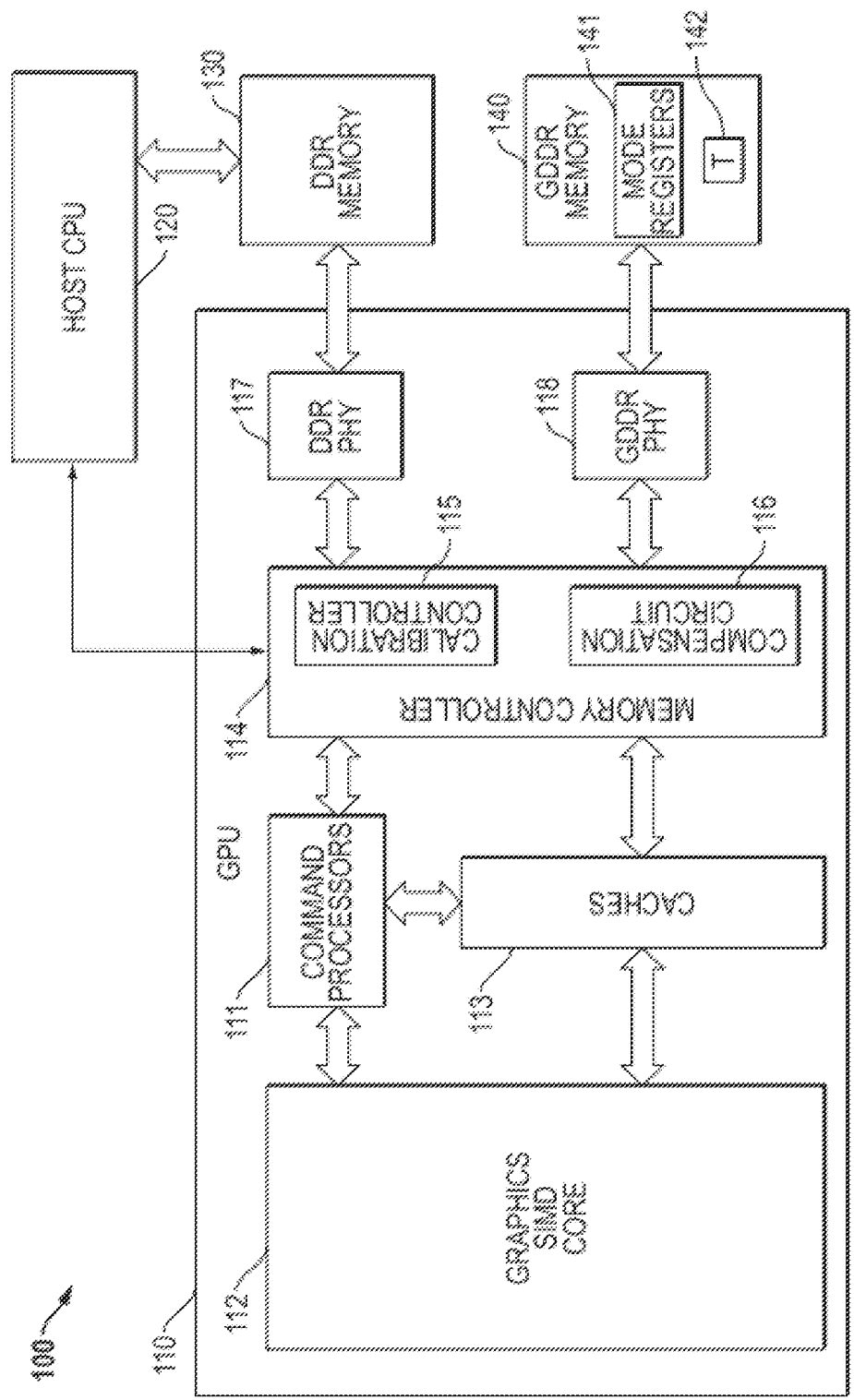
FIG. 1 illustrates in block diagram for a data processing system that compensates for VT drift according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A data processing system includes a data processor coupled to a memory. The data processor includes a physical layer circuit (PHY) for coupling to a memory bus, a calibration circuit, and a compensation circuit. The calibration circuit performs a link retraining sequence for a plurality of data (DQ) lanes of the memory bus and determines a first phase offset based on the link retraining. The compensation circuit calculates a second offset based on the first offset, and the calibration circuit applies the second offset to a plurality of command/address (CA) lanes of the memory bus.

A method is for a data processor to update timing values for accessing a memory to compensate for voltage and temperature (VT) drift during operation. The method includes performing a link retraining sequence for a plurality of DQ lanes of the memory bus and determining a first phase offset based on the link retraining. The method includes calculating a second offset based on the first offset, applying the second offset to a plurality of command CA lanes of the memory bus.

An integrated circuit includes a PHY for coupling to a memory bus, a calibration circuit, and a compensation circuit. The calibration circuit performs a link retraining sequence for a plurality of DQ lanes of the memory bus and determining a first phase offset based on the link retraining. The compensation circuit for calculates a second offset based on the first offset, and the calibration circuit applies the second offset to a plurality of CA lanes of the memory bus.

FIG. 1 illustrates in block diagram for a data processing system 100 that compensates for VT drift according to some embodiments. Data processing system 100 includes generally a data processor in the form of a graphics processing unit (GPU) 110, a host central processing unit (CPU) 120, a double data rate (DDR) memory 130, and a graphics DDR (GDDR) memory 140.

GPU 110 is a discrete graphics processor that has extremely high performance for optimized graphics processing, rendering, and display, but requires a high memory bandwidth for performing these tasks. GPU 110 includes generally a set of command processors 111, a graphics single instruction, multiple data (SIMD) core 112, a set of caches 113, a memory controller 114, a DDR physical interface circuit (DDR PHY) 117, and a GDDR PHY 118.

Command processors 111 are used to interpret high-level graphics instructions such as those specified in the OpenGL programming language. Command processors 111 have a bidirectional connection to memory controller 114 for receiving high-level graphics instructions such as OpenGL instructions, a bidirectional connection to caches 113, and a bidirectional connection to graphics SIMD core 112. In response to receiving the high-level instructions, command processors issue low-level instructions for rendering, geometric processing, shading, and rasterizing of data, such as frame data, using caches 113 as temporary storage. In response to the graphics instructions, graphics SIMD core 112 performs low-level instructions on a large data set in a massively parallel fashion. Command processors 111 and caches 113 are used for temporary storage of input data and output (e.g., rendered and rasterized) data. Caches 113 also have a bidirectional connection to graphics SIMD core 112, and a bidirectional connection to memory controller 114.

Memory controller 114 has a first upstream port connected to command processors 111, a second upstream port connected to caches 113, a first downstream bidirectional port to DDR PHY 117, and a second downstream bidirectional port to GDDR PHY 118. As used herein, "upstream" ports are on a side of a circuit toward a data processor and away from a memory, and "downstream" ports are in a direction away from the data processor and toward a memory. Memory controller 114 controls the timing and sequencing of data transfers to and from DDR memory 130 and GDDR memory 140. DDR and GDDR memory have asymmetric accesses, that is, accesses to open pages in the memory are faster than accesses to closed pages. Memory controller 114 stores memory access commands and processes them out-of-order for efficiency by, e.g., favoring accesses to open pages, while observing certain quality-of-service objectives.

DDR PHY 117 has an upstream port connected to the first downstream port of memory controller 114, and a downstream port bidirectionally connected to DDR memory 130. DDR PHY 117 meets all specified timing parameters of the version of DDR memory 130, such as DDR version five (DDR5), and performs timing calibration operations at the direction of memory controller 114. Likewise, GDDR PHY 118 has an upstream port connected to the second downstream port of memory controller 114, and a downstream port bidirectionally connected to GDDR memory 140. GDDR PHY 118 meets all specified timing parameters of the version of GDDR memory 140, such as GDDR version seven (GDDR7), and performs timing calibration operations at the direction of memory controller 114.

The interface timing to DDR memory 130 and GDDR memory 140 are susceptible to VT drift. Known techniques for compensation for VT drift center around periodic retraining of the link. However, retraining causes all operations in the system to be stalled while performing the retraining, which may hurt performance and cause jumps and stalls in graphics workloads, diminishing user experience.

In order to overcome the burden of periodic retraining, the inventors have developed various methods for reducing system link sensitivity to VT-induced phase drift. The disclosed VT drift compensation methods reduce, and in some cases eliminate, the need for periodic high-speed link phase retraining. In the exemplary embodiment, the techniques are applied to GDDR7 memory interface but they are not restricted to only GDDR7 memory nor only to memory interfaces.

As shown in FIG. 1, memory controller 114 includes a calibration controller 115 for performing basic link calibration, and a compensation circuit 116 for compensating for VT drift without the need for frequent retraining, thus increasing system performance and improving user experience.

Calibration controller 115 is a circuit that controls calibration of timing parameters for DDR PHY and 117 and GDDR PHY 118. On system startup, the link between DDR PHY 117 and DDR memory 130 has to be trained, and the link between GDDR PHY 118 and GDDR memory 140 is trained. Training generally includes determining the value of a reference voltage used by the memory and PHY to capture input data, the timing relationship between the command clock and data clock(s), and the timing relationship between data and the clock at the sender so that it can be reliably captured by the receiver. Techniques for performing these calibrations are well known and vary based on the DDR and GDDR versions. Moreover, a de facto industry standard for the interface between the memory controller and the memory PHY known as the "DFI" standard has been developed to specify the signaling and characteristics of the interface between the memory controller and the PHY. One of the features of recent versions of the DFI standard is the definition of certain lower-level training features such that most of the calibration functions performed automatically by the PHY, while the overall calibration flow is directed by the memory controller.

In accordance with various embodiments disclosed herein, compensation circuit 116 leverages these capabilities of the PHY circuit such as GDDR PHY 118 to adjust for VT drift without having to do a recalibration operation using calibration controller 115 and GDDR PHY 118. Compensation circuit 116 calculates drifts in timing parameters that are used to control delays in GDDR PHY 118. In one particular embodiment, compensation circuit 116 calculates drifts based on a measured temperature change, at least one voltage sensitivity coefficient, and at least one temperature sensitivity coefficient, and compensates for the timing changes based on these parameters by updating delay amounts of GDDR PHY 118.

GDDR memory 140 includes a set of mode registers 141 and a temperature sensor 142. Mode registers 141 provide a programming interface to control the operation of GDDR memory 140 in the data processing system. As will be explained further below, mode registers 141 store at least one voltage sensitivity coefficient and at least one temperature sensitivity coefficient that are used in VT drift compensation. GDDR memory 140 also includes a temperature sensor for measuring the temperature of GDDR memory 140. In one form, the temperature sensor 142 provides temperature data to compensation circuit 116 in GPU 110 during a refresh operation that ensures that compensation circuit 116 receives updated temperature information periodically.

The inventors have discovered that certain calibrated timing parameters can be adjusted based on measured temperature and voltage differences and recalibration results from other timing parameters, without the need for a performance-impacting recalibration during normal operation. Accordingly, this disclosure describes various methods for reducing system link sensitivity to VT-induced phase drift. This disclosure is presented with respect to a proposed graphics DDR, version seven (GDDR7) memory interface but is not restricted to only GDDR7 memory nor only to memory interfaces.

For some GDDR, version 6 (GDDR6) physical layer interface (PHY) systems, voltage and temperature (VT) drift of several parameters are characterized by the DRAM manufacturers. For example, "WCK2DQI" is a write clock (WCK) to data in delay, "WCK2DQO" is a WCK to data-out delay, and "WCK2CA" is a WCK to command/address delay. However, process variations and other factors make a general characterization of such parameters impractical for many DRAMs. Similar difficulties are expected with upcoming GDDR7 PHY systems.

Figure 2:
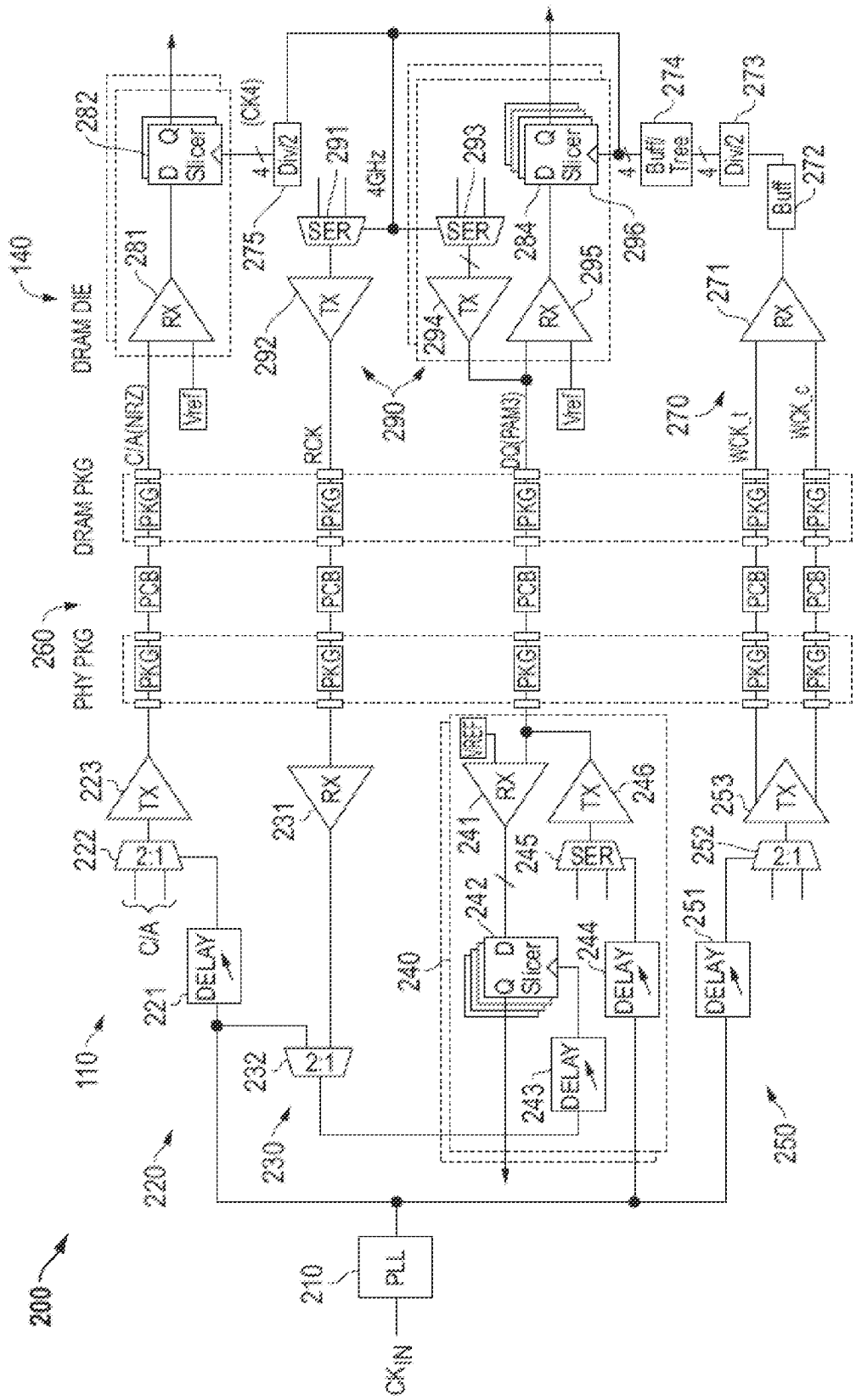
FIG. 2 illustrates in block diagram form a GDDR PHY-DRAM link of the data processing system of FIG. 1 according to some embodiments.

FIG. 2 illustrates in block diagram form a GDDR PHY-DRAM link 200 of data processing system 100 of FIG. 1 according to some embodiments. GDDR PHY-DRAM link 200 includes portions of GPU 110 and GDDR memory 140 that communicate over a physical interface 260.

GPU 110 includes a phase locked loop (PLL) 210, a command and address ("C/A") circuit 220, a read clock circuit 230, a data circuit 240, and a write clock circuit 250. These circuits form part of GDDR PHY 118 of GPU 110.

Phase locked loop 210 operates as a reference clock generation circuit and has an input for receiving an input clock signal labelled "$CK_{IN}$", and an output.

C/A circuit 220 includes a delay element 221, a selector 222, and a transmit buffer 223 labelled "TX". Delay element 221 has an input connected to the output of PLL 210, and an output, and has a variable delay controlled by an input, not specifically shown in FIG. 2. The variable delay is determined at startup by calibration controller 115 and adjusted during operation by compensation circuit 116 according to the techniques described herein. Selector 222 has a first input for receiving a first command/address value, a second input for receiving a second command/address value, and a control input connected to the output of delay element 221. Transmitter 223 has an input connected to the output of selector 222, and an output connected to a corresponding integrated circuit terminal for providing a command/address signal labelled "C/A" thereto. Note that C/A circuit 220 includes a set of individual buffers for each signal in the C/A signal group that are constructed the same as the representative selector 222 and buffer 223 shown in FIG. 2, but only a representative C/A circuit 220 is shown.

Read clock circuit 230 include a receive buffer 231 labelled "RX", and a selector 232. Receive buffer 231 has an input connected to a corresponding integrated circuit terminal for receiving a signal labelled "RCK", and an output. Receive clock selector 232 has a first input for connected to the output of PLL 210, a second input connected to the output of receive buffer 231, an output, and a control input for receiving a mode signal, not shown in FIG. 2.

Data circuit 240 includes a receive buffer 241, a latch 242, delay elements 243 and 244, a serializer 245, and a transmit buffer 246. Receive buffer 241 has a first input connected to an integrated circuit terminal that receives a data signal labelled generically as "DQ", a second input for receiving a reference voltage labelled "VREF", and an output. Latch 242 is a D-type latch having an input labelled "D" connected to the output of receive buffer 241, a clock input, and an output labelled "Q" for providing an output data signal. The interface between GDDR PHY 118 and GDDR memory 140 implements a three-level, pulse amplitude modulation data signaling system known as "PAM-3", which encodes data bits into one of three nominal voltage levels. Thus, receive buffer 241 discriminates which of the three levels is indicated by the input voltage, and outputs two bits to represent the state in response. Three bits of data are encoded to and decoded from two unit intervals. For example, receive buffer 241 could generate two slicing levels based on VREF defining three ranges of voltages, and use two comparators to determine which range the received data signal falls in. In other embodiments, other PAM schemes are employed, such as PAM-4, for example. Data circuit 240 includes latches which latch the two data bits and is replicated for each bit position. Delay element 243 has an input connected to the output of selector 232, and an output connected to the clock input of latch 242. Delay element 244 has an input connected to the output of PLL 210, and an output. Serializer 245 has inputs for receiving a first data value of a given bit position and a second data value of the given bit position, the first and second data values corresponding to sequential cycles of a burst, a control input connected to the output of delay element 244, and an output connected to the corresponding DR terminal. Each data byte of the data bus has a set of data circuits like data circuit 240 for each bit of the byte. This replication allows different data bytes that have different routing on the printed circuit board to have different delay values.

Write clock circuit 250 includes a delay element 251, a selector 252, and a transmit buffer 253. Delay element 251 has an input connected to the output of PLL 210, and an output. Selector 252 has a first input for receiving a first clock state signal, a second input for receiving a second clock voltage, a control input connected to the output of delay element 251, and an output. Transmit buffer 253 has an input connected to the output of selector 252, and an output a first output connected to a corresponding integrated circuit terminal for providing a true write clock signal labelled "WCK_t" thereto, and a second output connected to a corresponding integrated circuit terminal for providing a complement write clock signal labelled "WCK_c" thereto.

GDDR memory 140 includes generally a write clock receiver 270, a command/address receiver 280, and a data path transceiver 290. Write clock receiver 270 includes a receive buffer 271, a buffer 272, a divider 273, a buffer/tree 274, and a divider 275. Receive buffer 271 has a first input connected to an integrated circuit terminal of GDDR memory 140 that receives the WCK_t signal, a second input connected to an integrated circuit terminal of GDDR memory 140 that receives the WCK_c signal, and an output.

In the example shown in FIG. 2, the output of receive buffer 271 is clock signal having a nominal frequency of 8 GHz. Buffer 272 has an input connected to the output of receive buffer 271, and an output. Divider 273 has an input connected the output of buffer 272, and an output for providing a divided clock having a nominal frequency of 4 GHz. Divider 275 has an input for connected to the output of buffer/tree 274, and an output for providing a clock signal labelled "CK4" having a nominal frequency of 2 GHz.

Command/address receiver 280 includes a receive buffer 281 and a slicer 282. Receive buffer 281 has a first input connected to a corresponding integrated circuit terminal of GDDR memory 140 that receives the C/A signal, a second input for receiving VREF, and an output. The C/A input signal is received as a normal binary signal having two logic states levels and is considered a non-return-to-zero (NRZ) signal encoding. Slicer 282 has a set of two data latches each having a D input connected to the output of receive buffer 281, a clock input for receiving a corresponding one of the output of divider 275, and a Q output for providing a corresponding C/A signal.

Data path transceiver 290 includes a serializer 291, a transmitter 292, a serializer 293, a transmitter 294, a receive buffer 295, and a slicer 296. Serializer 291 has an input for receiving a first read clock level, a second input for receiving a second read clock level, a select input connected to the output of buffer/tree 274, and an output. Transmitter 292 has an input connected to the output of serializer 293, and an output connected to the RCK terminal of GDDR memory 140. Serializer 293 has an input for receiving a first read data value, a second input for receiving a second data value, a select input connected to the output of buffer/tree 274, and an output. Transmitter 294 has an input connected to the output of serializer 293, and an output connected to the corresponding DQ terminal of GDDR memory 140. Receive buffer 295 has a first input connected to the corresponding DQ terminal of GDDR memory 140, a second input for receiving the VREF value, and an output. Slicer 296 has a set of four data latches each having a D input connected to the output of receive buffer 295, a clock input connected to the output of buffer/tree 274, and a Q output for providing a corresponding DQ signal.

Interface 260 includes a set of physical connections that are routed between a bond pad of the GPU 110 die, through a package impedance to a package terminal, through a trace on a printed circuit board, to a package terminal of GDDR memory 140, through a package impedance, and to a bond pad of the GDDR memory 140 die.

In operation, data processing system can be used as a graphics card or accelerator because of the high bandwidth graphics processing performed by graphics SIMD core 112. Host CPU 120, running an operating system or an application program, sends graphics processing commands to CPU 110 through DDR memory 130, which serves as a unified memory for GPU 110 and host CPU 120. It may send the commands using, for example, as OpenGL commands, or through any other host CPU to GPU interface. OpenGL was developed by the Khronos Group, and is a cross-language, cross-platform application programming interface for rendering 2D and 3D vector graphics. Host CPU 120 uses an application programming interface (API) to interact with GPU 110 to provide hardware-accelerated rendering.

Data processing system 100 uses two types of memory. The first type of memory is DDR memory 130, and is accessible by both GPU 110 and host CPU 120. As part of the high performance of graphics SIMD core 112, GPU 110 uses a high-speed graphics double data rate (GDDR)

memory. For example, the new graphics double data rate, version seven (GDDR7) memory will be able to achieve very high link speeds and 24-40 gigabits per second (Gbps) per-pin bandwidth. Because of the high bandwidth, GDDR7 is suitable for very high-performance graphics operations.

In high-speed DDR memories, read or write data can have variable transmission path delays that change with respect to the clock signal that is used to latch the data elements. The various signal processing paths lengths inject skew into the system such that as VT changes during operation, the drifts in various signal paths do not track each other such that simple temperature scaling adjustments described in the DRAM datasheets do not produce accurate compensated calibration values.

Figure 3:
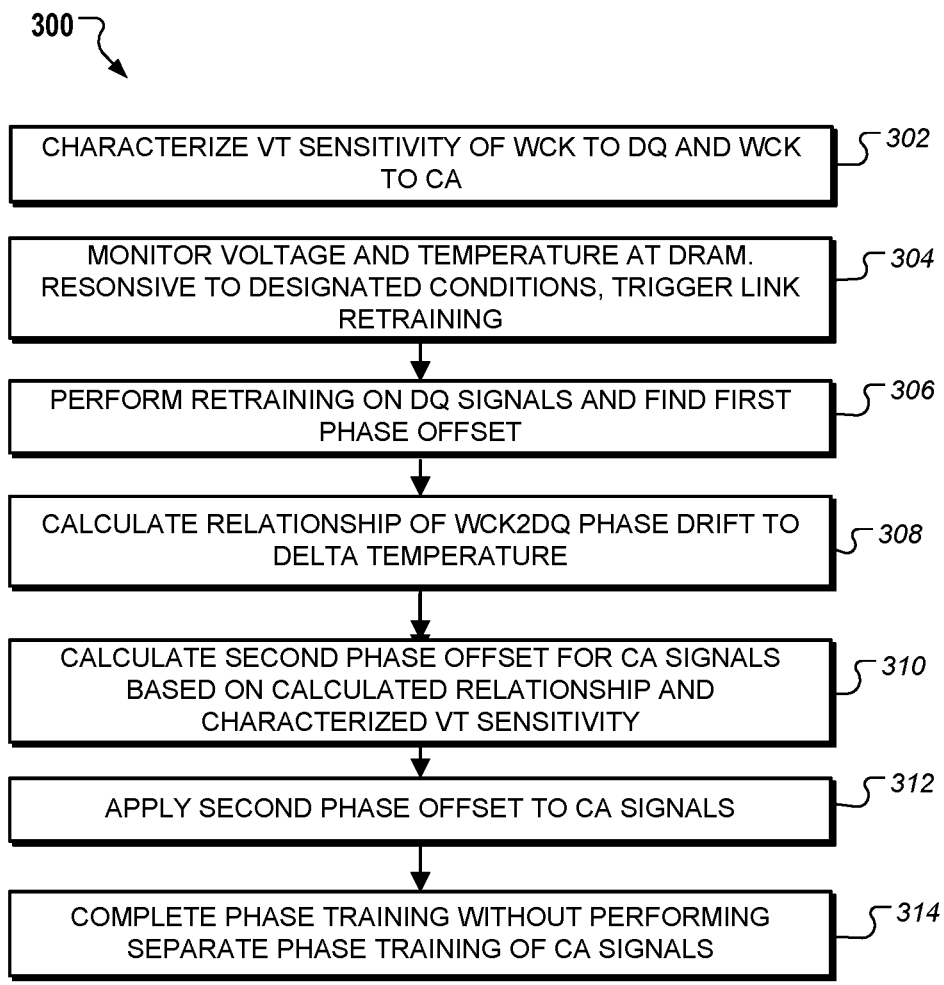
FIG. 3 shows a flow diagram of a process for training a PHY-DRAM link according to some embodiments.

FIG. 3 shows a flow diagram 300 of a process for operating a training circuit according to some embodiments. The depicted process is suitable for use with data processing system 100 of FIG. 1, or other systems which include a DDR/GDDR memory controller. In this embodiment, the process is performed by calibration controller 115 in cooperation with the PHY circuit being trained, for example GDDR PHY 118 or DDR PHY 117. Generally, the process employs drift information obtained from training the DQ lines of the PHY, together with calculated timing parameter information, to perform feed-forward adjustment of CA lines without performing a full phase training of the CA lines of the PHY.

The process starts at block 302 where it characterizes the VT sensitivity of WCK to DQ and WCK to CA. In preferred implementations the characterizations uses the DRAM manufacturers' specifications for VT sensitivity, specifically the WCK2DQI and WCK2CA specifications. A similar characterization may be measured and updated over time. The characterization is to account for the fact that WCK2DQ phase changes over time are caused largely by changes in temperature for a given process. WCK2DQ has a different temperature coefficient as compared to WCK2CA, but the two are correlated and have similar process sensitivity.

Next at block 304, the process monitors voltage and temperature conditions at the DRAM, and responsive to designated conditions regarding voltage and/or temperature, triggers a link retraining to adjust the link for VT drift.

At block 306, the process performs a training on the DQ signals to find a one or more phase offsets applied to the PHY driver circuits to compensate for VT drift. This training may be accomplished by a variety of training methods, and generally provides a phase offset which is applied to the PHY drivers on the memory controller end of the link. The return link from the DRAM may also be trained but is not used in the CA adjustment process herein. The process may find a phase offset on a per-line basis or a general phase offset applied to all DQ lines.

At block 308, the process calculates a relationship of the WCK2DQ phase drift to the delta temperature. If phase offsets are provided for individual DQ lines, an average phase offset may be calculated to be used in the process. The calculation may be performed in a variety of ways, but is generally performed by calculating a temperature sensitivity of WCK2DQ which is then assumed to have a correlated VT drift to the WCK2CA temperature sensitivity because of similar circuitry and path lengths. For example, Equations [1] and [2] are assumed to apply, once the actual temperature sensitivity is known:

$$WCK2DQ\_phase\_drift = WCK2DQ\_temp\_sensitivity * delta\_temperature$$

$$WCK2CA\_phase\_drift = WCK2CA\_temp\_sensitivity * delta\_temperature$$

A preferred implementation calculates the relationship based on actual conditions. The expected temperature sensitivity of WCK2DQ and WCK2CA values are generally published in DRAM data sheets. However, they will change with manufacturing process variations and other variations in conditions. Such changes in parameters are generally not able to be characterized in advance by the DRAM vendors. Thus, the process infers the temperature sensitivity delta from the known published values as follows. The training that was performed at block 306 directly measures WCK2DQ_phase_drift, and the temperature is also periodically monitored (block 304), so the delta temperature portion of Equations (1) and (2) is known by the process at block 308.

WCK2DQ_temp_sensitivity is calculated from rearranging Equation [1]. Then, the process compares this value to the expected values provided by the DRAM vendor to produce a percentage difference given in Equation [3] below as "temp_sensitivity_percent_different", which is used to calculate WCK2CA_temp_sensitivity as shown in Equation [4].

$$temp\_sensitivity\_percent\_different = WCK2DQ\_temp\_sensitivity / datasheet\_WCK2DQ\_temp\_sensitivity \quad [3]$$

$$WCK2CA\_temp\_sensitivity = datasheet\_WCK2DQ\_temp\_sensitivity * temp\_sensitivity\_percent\_different$$

Then, at block 310, the process calculates the WCK2CA_phase_drift term without any need for directly training CA path. That term is given by Equation (5):

$$WCK2CA\_phase\_drift = WCK2CA\_temp\_sensitivity * delta\_temperature.$$

At block 312, the process applies the calculated phase drift to the CA signals on the PHY, by setting a phase offset for drivers of the CA signals. This offset is applied without the need for performing separate phase training of the CA signals, and the phase training process is completed as shown at block 314.

While, in this embodiment, the process first performs retraining of the DQ signals, and employs the results to determine and apply a phase offset for CA signals, in other embodiments the process may apply a phase offset for DQ signals based on training CA signals. In such embodiments, the process is similar to that of FIG. 3, with the roles of CA and DQ switched in each block.

Thus, various embodiments of circuits, processes, and systems for improved phase training have been described. The techniques herein provide for faster training updates of the PHY. While the described process employs an actual phase offset produced by training DQ lines, and a calculated phase offset applied to CA lines, in other implementations other pairs of PHY signaling lines may be used in a similar fashion by training a first one or more drivers and, based on a phase offset produced by the training, and known characterization data regarding temperature sensitivity, calculating a second phase offset. Further, while temperature sensitivity coefficients are employed in the calculation discussed above, a similar calculation may be performed also including a characterized voltage sensitivity and an actual voltage sensitivity.

A data processing system or portions thereof described herein can be embodied one or more integrated circuits, any of which may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the embodiments have been described with reference to a soon-to-be standardized graphics double data rate (GDDR) design known as GDDR, version seven (GDDR7), but can also be applied to other memory types including non-graphics DDR memory, high-bandwidth memory (HBM), and the like. Moreover while they have been described with reference to a data processing system having a discrete GPU for very high performance graphics operations, they can also be applied to a data processing system with an accelerated processing unit (APU) in which the CPU and GPU are incorporated together on a single integrated circuit chip. The use of differential signaling or single-ended signaling, and NRZ data signaling, PAM-3 signaling or PAM-4 signaling, can also vary in different embodiments.

Accordingly, it is intended by the appended claims to cover all modifications of the disclosed embodiments that fall within the scope of the disclosed embodiments.

What is claimed is:

1. A data processing system comprising a data processor coupled to a memory, the data processor comprising: a physical layer circuit (PHY) for coupling to a memory bus; a calibration circuit for performing a link retraining sequence for a plurality of data (DQ) lanes of the memory bus and determining a first phase offset based on the link retraining; and a compensation circuit for calculating a second phase offset based on the first phase offset, wherein the calibration circuit is further operable to apply the second phase offset to a plurality of command/address (CA) lanes of the memory bus.

2. The data processing system of claim 1, wherein said calibration circuit applies the second phase offset to the plurality of CA lanes without performing phase training for the plurality of CA lanes during the link retraining sequence.

3. The data processing system of claim 1, wherein said compensation circuit calculates said second phase offset further based on a write clock (WCK) to DQ temperature sensitivity characteristic and a WCK to CA temperature sensitivity characteristic.

4. The data processing system of claim 3, wherein said compensation circuit calculates said second phase offset further based on a measured temperature change, and a relationship between a characterized WCK to DQ temperature sensitivity characteristic and an actual WCK to DQ temperature sensitivity characteristic.

5. The data processing system of claim 1, wherein said calibration circuit comprises: a calibration controller for issuing memory operations to determine said current values.

6. The data processing system of claim 1, wherein the memory comprises: a mode register for storing said at least one voltage sensitivity coefficient and said at least one temperature sensitivity coefficient; and a temperature sensor for measuring a temperature of the memory, wherein the memory provides said temperature to the data processor during a predetermined operation.

7. A method for a data processor to update timing values for accessing a memory to compensate for voltage and temperature (VT) drift during operation, comprising: performing a link retraining sequence for a plurality of data (DQ) lanes of the memory bus and determining a first phase offset based on the link retraining; calculating a second phase offset based on the first phase offset; and applying the second phase offset to a plurality of command/address (CA) lanes of the memory bus.

8. The method of claim 7, wherein applying the second phase offset to the plurality of CA lanes is performed without performing phase training for the plurality of CA lanes during the link retraining sequence.

9. The method of claim 7, wherein calculating said second phase offset is further based on a write clock (WCK) to DQ temperature sensitivity characteristic and a WCK to CA temperature sensitivity characteristic.

10. The method of claim 9, further comprising calculating the second phase offset is further based on a measured temperature change, and a relation ship between a characterized WCK to DQ temperature sensitivity characteristic and an actual WCK to DQ temperature sensitivity characteristic.

11. The method of claim 10, further comprising storing the characterized WCK to DQ temperature sensitivity in a configuration register.

12. The method of claim 8, wherein calculating said second offset is further based on based on a measured temperature change, at least one voltage sensitivity coefficient, and at least one temperature sensitivity coefficient.

13. The method of claim 7, further comprising: measuring a temperature of the memory, providing said temperature to the data processor during a predetermined operation.

14. An integrated circuit comprising: a physical layer circuit (PHY) for coupling to a memory bus; a calibration circuit for performing a link retraining sequence for a plurality of data (DQ) lanes of the memory bus and determining a first phase offset based on the link retraining; and a compensation circuit for calculating a second phase offset based on the first phase offset, wherein the calibration circuit is further operable to apply the second phase offset to a plurality of command/address (CA) lanes of the memory bus.

15. The integrated circuit of claim 14, wherein said calibration circuit applies the second phase offset to the plurality of CA lanes without performing phase training for the plurality of CA lanes during the link retraining sequence.

16. The integrated circuit of claim 14, wherein said compensation circuit calculates said second phase offset further based on a write clock (WCK) to DQ temperature sensitivity characteristic and a WCK to CA temperature sensitivity characteristic.

17. The integrated circuit of claim 16, wherein said compensation circuit calculates said second phase offset further based on a measured temperature change, and a relationship between a characterized WCK to DQ temperature sensitivity characteristic and an actual WCK to DQ temperature sensitivity characteristic.

18. The integrated circuit of claim 16, wherein said compensation circuit calculates said second phase offset further based on a measured temperature change, at least one voltage sensitivity coefficient, and at least one temperature sensitivity coefficient.

19. The integrated circuit of claim 14, wherein said calibration circuit comprises: a calibration controller for issuing memory operations to determine said current values.

20. The integrated circuit of claim 14, wherein the compensation circuit obtains a temperature reading from the memory during a designated operation.

* * * * *